United States Patent
Nishida et al.

(10) Patent No.: US 7,351,447 B2
(45) Date of Patent: Apr. 1, 2008

(54) METHOD OF PRODUCING ANTI-REFLECTION FILM

(75) Inventors: Mitsuhiro Nishida, Tokyo (JP); Yukihiro Kusano, Roskilde (DK); Nobuko Kato, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 923 days.

(21) Appl. No.: 10/804,073

(22) Filed: Mar. 19, 2004

(65) Prior Publication Data

US 2004/0180138 A1 Sep. 16, 2004

Related U.S. Application Data

(63) Continuation-in-part of application No. 10/267,747, filed on Oct. 10, 2002, now abandoned.

(30) Foreign Application Priority Data

Oct. 12, 2001 (JP) ............................. 2001-315612

(51) Int. Cl.
*B05D 5/06* (2006.01)

(52) U.S. Cl. ............... 427/162; 427/164; 427/419.1; 428/212; 428/702; 428/328; 428/331

(58) Field of Classification Search ............... 427/162, 427/164, 419.1; 428/212, 702, 328, 331
See application file for complete search history.

(56) References Cited

U.S. PATENT DOCUMENTS

| | | | |
|---|---|---|---|
| 5,496,641 A * | 3/1996 | Mase et al. | 428/423.1 |
| 6,104,534 A * | 8/2000 | Ohta et al. | 359/588 |
| 6,248,448 B1 * | 6/2001 | Lippey et al. | 428/432 |
| 2001/0053438 A1 * | 12/2001 | Nishida et al. | 428/212 |
| 2005/0219680 A1 * | 10/2005 | Ishikawa | 359/291 |

FOREIGN PATENT DOCUMENTS

| | | |
|---|---|---|
| JP | H09-073001 | 3/1997 |
| JP | H09-165231 | 6/1997 |
| JP | H10-186104 | 7/1998 |

OTHER PUBLICATIONS

Machine english translation for portion of Japanese patent publication H09-073001; JPO, Oct. 2007.*
Machine english translation for portion of Japanese patent publication H09-165231; JPO, Oct. 2007.*
Machine english translation for portion of Japanese patent publication H10-186104; JPO, Oct. 2007.*

* cited by examiner

*Primary Examiner*—Alain L. Bashore
(74) *Attorney, Agent, or Firm*—Manabu Kanesaka

(57) ABSTRACT

A method of producing an anti-reflection film includes forming a first layer on a transparent substrate, forming a second layer on the first layer, and forming the third layer on the second layer. When an optical admittance Y at a surface of the second layer is represented by, $$Y = \frac{H}{E} = (x + iy)$$

where i is the imaginary number unit,
thicknesses and reflective indexes of the substrate, first layer, second layer, and third layer are selected so that x and y satisfy the following formula, $$0.9x\{(n^2-n_0^2)/2n_0\}^2 < \{x-(n^2+n_0^2)/2n_0\}^2 + y^2 < 1.1x\{(n^2-n_0^2)/2n_0\}^2$$

where n is a refractive index of the third layer and $n_0$ is a refractive index of an outer region at an outside of the anti-reflection film.

13 Claims, 3 Drawing Sheets

$$C_1: \left(x - \frac{n^2+n_0^2}{2n_0^2}\right)^2 + y^2 = 1.1\left(\frac{n^2-n_0^2}{2n_0}\right)^2$$

$$C_2: \left(x - \frac{n^2+n_0^2}{2n_0^2}\right)^2 + y^2 = \left(\frac{n^2-n_0^2}{2n_0}\right)^2$$

$$C_3: \left(x - \frac{n^2+n_0^2}{2n_0^2}\right)^2 + y^2 = 0.9\left(\frac{n^2-n_0^2}{2n_0}\right)^2$$

METHOD OF PRODUCING ANTI-REFLECTION FILM

CROSS REFERENCE TO RELATED APPLICATION

This is a continuation-in-part application of a patent application Ser. No. 10/267,747 filed on Oct. 10, 2002 now abandoned.

BACKGROUND OF THE INVENTION AND RELATED ART STATEMENT

The present invention relates to a method of producing an anti-reflection film with a desired reflectivity used for a display such as a CRT (cathode ray tube) screen and a PDP (plasma display panel) screen.

An anti-reflection film is generally formed of a plurality of layers having alternately laminated low-reflectivity layers and high-reflectivity layers on a transparent synthetic resin sheet. The anti-reflection film is attached to a CRT screen or a PDP screen with a transparent adhesive (including a self-attaching adhesive). When such an anti-reflection film is attached to the PDP or CRT, the synthetic resin sheet faces outside (side away from the CRT or PDP, or side exposed to the atmosphere).

In order to calculate reflectivity and transmittance of an anti-reflection film comprising multi-layer films, there are known methods such as vector method, Smith chart and Kard chart. In the methods for calculating the reflectivity and transmittance of an anti-reflection film, characteristic matrices M1, M2, M3, to Mk are determined for each layer using complex refractive indices and optical thicknesses, and then the characteristic matrix M is determined from the product of the characteristic matrices M1, M2, M3, to Mk. In designing the anti-reflection film, the refractive index and thickness of each layer are selected so that a desired reflectivity is obtained over a given wavelength range.

However, it is difficult to accurately calculate the characteristic matrix due to the complicated characteristic matrices and to obtain an optimum value.

In view of the problem, the present invention has been made, and an object of the invention is to provide a method for producing an anti-reflection film with a desired reflectivity.

Further objects and advantages of the invention will be apparent from the following description of the invention.

SUMMARY OF THE INVENTION

According to the present invention, a method of producing an anti-reflection film includes the steps of preparing a transparent substrate having a reflective index of $n_s$; selecting a first material having a reflective index of $n_1$; coating the first material on the transparent substrate to form a first layer having a thickness of $d_1$; selecting a second material having a reflective index of $n_2$; coating the second material on the first layer to form a second layer having a thickness of $d_2$; selecting a third material having a reflective index of $n_3$; and coating the third material on the second layer to form a third layer having a thickness of $d_3$. An optical admittance Y at a surface of the second layer opposite to the first layer is represented by, $$Y = \frac{H}{E} = (x+iy)$$

where i is the imaginary number unit, $$\begin{bmatrix} E \\ H \end{bmatrix} = \begin{bmatrix} \cos\delta_2 & (i/n_2)\sin\delta_2 \\ in_2\sin\delta_2 & \cos\delta_2 \end{bmatrix} \begin{bmatrix} \cos\delta_1 & (i/n_1)\sin\delta_1 \\ in_1\sin\delta_1 & \cos\delta_1 \end{bmatrix} \begin{bmatrix} 1 \\ n_s \end{bmatrix}$$

$$\delta_1 = 2\pi n_1 d_1/\lambda_0$$

$$\delta_2 = 2\pi n_2 d_2/\lambda_0$$

where $\lambda_0$ is a wavelength of incident light in vacuum.

In the present invention, the reflective index of the transparent substrate, the reflective index and thickness of the first layer, the reflective index and thickness of the second layer, and the reflective index of the third layer are selected so that x and y satisfy the following formula, $$0.9x\{(n^{32}-n_0^2)/2n_0\}^2 < \{x-(n_3^2+n_0^2)/2n_0\}^2 + y^2 < 1.1x\{(n_3^2-n_0^2)/2n_0\}^2$$

where $n_0$ is a refractive index of an outer region at an outside of the anti-reflection film.

Further, according to the present invention, an optical admittance $Y_e$ at a surface of the third layer opposite to the second layer is represented by, $$Y_e = \frac{H}{E}$$

$$\begin{bmatrix} E_e \\ H_e \end{bmatrix} = \begin{bmatrix} \cos\delta_3 & (i/n_3)\sin\delta_3 \\ in_3\sin\delta_3 & \cos\delta_3 \end{bmatrix} \begin{bmatrix} \cos\delta_2 & (i/n_2)\sin\delta_2 \\ in_2\sin\delta_2 & \cos\delta_2 \end{bmatrix}$$
$$\begin{bmatrix} \cos\delta_1 & (i/n_1)\sin\delta_1 \\ in_1\sin\delta_1 & \cos\delta_1 \end{bmatrix} \begin{bmatrix} 1 \\ n_s \end{bmatrix}$$

$$\delta_3 = 2\pi n_3 d_3/\lambda_0$$

The thickness of the third layer is selected so that $E_e$ become closer to 1 and $H_e$ becomes closer to $n_0$.

In the present invention, the transparent substrate, the first layer, the second layer, and the third layer are formed such that the interface between the second layer and the third layer has the optical admittance Y, and the interface between the third layer and the outer region has the optical admittance $Y_e$. When the optical admittances Y and $Y_e$ satisfy the formula described above, it is possible to produce the anti-reflection film with a desired anti-reflection characteristic.

In the present invention, it is also possible to form an additional thin layer between the transparent substrate and the first layer.

DETAILED DESCRIPTION OF PREFERRED EMBODIMENT

Figure 1:
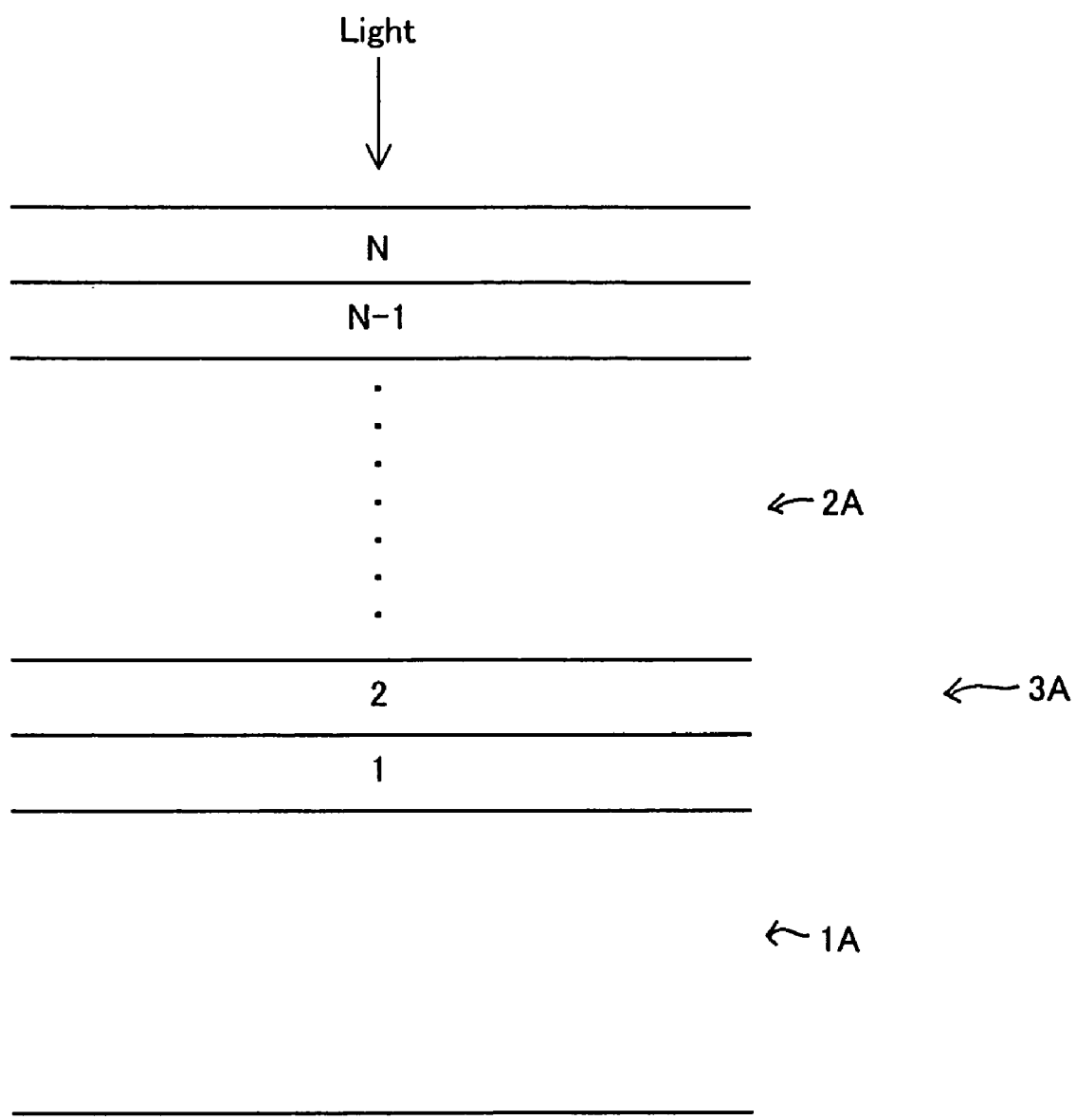
FIG. 1 is a schematic cross sectional view of an anti-reflection film according to the present invention.

Hereunder, embodiments of the present invention will be explained with reference to the accompanying drawings. According to the present invention, an anti-reflection film includes a transparent substrate and a plurality of thin layers formed on the transparent substrate. An outermost layer further most from the transparent substrate is also a transparent layer.

It is preferable that the transparent substrate has an attenuation constant k of substantially zero in the visible light range. The transparent substrate is formed of a synthetic resin sheet such as a polyethylene terephthalate (PET) film with a thickness of about 30 to 300 μm.

The number of the thin layers formed on the transparent substrate may be 2 to 10. A hard coat layer may be formed on the transparent substrate first for protecting the transparent substrate. The hard coat layer may have a thickness of about 2 to 20 μm.

When four or more thin layers are formed on the transparent substrate, the thin layers may have arbitrary thicknesses except the outermost layer and a layer next to the outermost layer. Each of the thin layers may have a different refractive index. The thin layers other than the outermost layer and the layer next to the outermost layer may be formed of a transparent synthetic resin such as an acrylic resin and a methacrylic resin.

The layer next to the outermost layer may have an attenuation coefficient k of larger than 0.001, in particular, between 0.01 and 10. A material for the layer next to the outermost layer having such an attenuation coefficient includes a composite material of a transparent synthetic resin filled with fine particles of metal, metal oxide, or metal nitride; and a thin layer of metal, metal oxide, or metal nitride. The layer may be deposited with PVD (physical vapor deposition) method such as vacuum vapor deposition and sputtering. The layer next to the outermost layer formed with the PVD method may have a thickness of 30 nm or less, and in particular, about 1 to 10 nm.

The metal suitable for the fine particles includes Au, Pt, Ag, Ti, Zn, Cu, Al, Cr, Co, Ni, C, Si, B, Ge, Zr, Nb, Mo, Pd, Cd, In and Sn. The metal oxide and metal nitride include those of Ag, Ti, Zn, Cu, Al, Cr, Co, Ni, C, Si, B, Ge, Zr, Nb, Mo, Pd, Cd, In and Sn.

The anti-reflection film may have anti-electrostatic characteristic (specific resistivity of $5\times10^{12}$ Ω/□ or less). It is particularly desirable that the anti-reflection film has minimum reflectivity of 0.5% or less, luminosity reflectivity of 1% or less, the specific resistivity of $10^7$ Ω/□ or less, and transmittance of 60% or more. When the layer next to the outermost layer contains the fine particles of metal, conductive metal oxide, or metal nitride, the anti-reflection film has a lower specific resistivity, thereby improving the anti-electrostatic characteristic.

The outermost layer may be transparent to visible light, and may have negligible small absorption of the visible light. A material for the outermost layer includes an acrylic resin or a methacrylic resin. The outermost layer may contain transparent filler such as silica and MgF.

In the embodiment, the outermost layer is exposed to the atmosphere. Alternatively, the outermost layer is attached to an adhesive. In such a case, the anti-reflection film is attached to a transparent panel such as a glass plate with the adhesive.

In general, an optical admittance Y is defined by a ratio (Y=H/E) of a magnetic field component H to an electric field component E of the light wave. When the light wave passes through a single layer having a refractive index of n, the refractive index n and the optical admittance Y of the layer have the following relation:

$$Y = \frac{1}{(\varepsilon_0/\mu_0)^{\frac{1}{2}}} n \qquad (1)$$

where $\varepsilon_0$ is a dielectric constant and $\mu_0$ is a magnetic permeability in vacuum. In the custom unit system, the dielectric constant and magnetic permeability in vacuum are equal to one. Accordingly, the optical admittance Y is equal to the refractive index n of the single layer as shown by the following equation:

$$Y=n \qquad (2)$$

This is the case where the light wave travels in a single layer. When the light wave travels in a laminated film having a plurality of thin layers with different refractive indices in a thickness direction, a part of the progressive wave reflects at interfaces between the layers and returns in a direction opposite to the direction of the progressive-wave (hereinafter, the wave returning in the opposite direction to the traveling direction is referred to as a returning wave). Therefore, the light wave in each of the layers is a combined wave of the progressive wave and returning wave reflected at the interfaces.

Accordingly, the electric field component E and magnetic field component H of the light wave (combined wave) in the each layer are different from those of the progressive wave alone. As a result, the optical admittance Y (ratio of the magnetic field to the electric field) also changes, and does not match to the refractive index of the each layer any more.

FIG. 1 is a schematic cross sectional view of an anti-reflection film 3A. The anti-reflection film 3A comprises a transparent substrate 1A and thin film layers 2A laminated on the transparent substrate 1A. The thin film layers 2A include a layer 1 to a layer N (N-th layer) sequentially laminated on the transparent substrate 1A.

When the light enters the film 3A through the layer N, the following relation is established among $E_s$, $H_s$, $E_d$, and $H_d$, wherein $E_s$ and $H_s$ are the electric field component and magnetic field component of the light at an interface between the transparent substrate 1A and the layer 1, and $E_d$ and $H_d$ are the electric field component and magnetic field component of the light at a position in the first layer 1 away from the interface by a distance $d_1$:

$$\begin{bmatrix} E_d \\ H_d \end{bmatrix} = \begin{bmatrix} \cos\delta_1 & (i/n_1)\sin\delta_1 \\ in_1\sin\delta_1 & \cos\delta_1 \end{bmatrix} \begin{bmatrix} E_s \\ H_s \end{bmatrix} \qquad (3)$$

$$\delta_1 = 2\pi n_1 d_1/\lambda \qquad (4)$$

wherein i is the imaginary number unit, $n_1$ is a complex refractive index of the layer 1, λ is a wavelength of the incident light in vacuum, and $\delta_1$ is called a phase thickness.

In this case, the transparent substrate 1A has a thickness large enough to ignore the effect of the returning wave. Accordingly, the optical admittance $Y_s$ of the transparent substrate ($Y_s=H_s/E_s$) is equal to a reflective index $N_s$ of the transparent substrate ($H_s=N_s$, $E_s=1$, $Y_s=N_s$). Therefore, from Equation (3), the optical admittance $Y_d$ at the position $d_1$ in the layer 1 is represented by the following equation:

$$Y_d = \frac{H_d}{E_d} = \frac{N_s\cos\delta_1 + in_1\sin\delta_1}{\cos\delta_1 + i(N_s/n_1)\sin\delta_1} \quad (5)$$

As indicated in Equations (4) and (5), the optical admittance $Y_d$ in the layer 1 depends on the distance $d_1$ from the interface between the layer 1 and the transparent substrate 1A. It is possible to calculate the optical admittance at an arbitrary position in the layer N considering that the optical admittance is continuous.

Suppose that an interface between the outermost layer N and the next layer N-1 has an optical admittance Y, and an outer point of the outermost layer N (first layer), i.e. an interface between the outermost layer and an outer region (usually the atmosphere), has an optical admittance $Y_e$. Y and $Y_e$ are expressed by the following equations:

$$Y = x + iy \quad (6)$$

$$Y_e = x_e + iY_e \quad (7)$$

When the outermost layer is transparent, the refractive index of the outermost layer is represented by a real number n. Therefore, from Equation (3), the following equation is established:

$$\begin{bmatrix} E_e \\ H_e \end{bmatrix} = \begin{bmatrix} \cos\delta & (i/n)\sin\delta \\ in\sin\delta & \cos\delta \end{bmatrix} \begin{bmatrix} E \\ H \end{bmatrix} \quad (8)$$

where $\delta = 2\pi nd/\lambda_0$, $\lambda_0$ is a wavelength of the incident light in vacuum, and d is a thickness of the outermost layer N. From Equations (7) and (8), the following equation is obtained:

$$\begin{bmatrix} E \\ H \end{bmatrix} = \begin{bmatrix} \cos\delta & -(i/n)\sin\delta \\ -in\sin\delta & \cos\delta \end{bmatrix} \begin{bmatrix} E_e \\ H_e \end{bmatrix} \quad (9)$$

$$Y = \frac{H}{E} = \frac{y_e\cos\delta - in\sin\delta)}{\cos\delta - y_e\frac{n_i}{n}\sin\delta} \quad (10)$$

From Equations (6) and (10), x and y of the optical admittance Y at the interface between the outermost layer N and the layer N-1 next to the outermost layer-N are represented by the following equations:

$$x = \frac{x_e}{\left\{1 + \frac{2y_e\tan\delta}{n} + \frac{(x_e^2 + y_e^2)\tan^2\delta}{n^2}\right\}\cos^2\delta} \quad (11)$$

$$y = \frac{y_e(1 - \tan^2\delta) - n\left(1 - \frac{x_e^2 + y_e^2}{n^2}\right)\tan\delta}{1 + \frac{2y_e\tan\delta}{n} + \frac{(x_e^2 + y_e^2)\tan^2\delta}{n^2}} \quad (12)$$

When the outer region (usually air or adhesive) at an outside of the outermost layer N has the optical admittance $Y_0$ (equal to the refractive index $n_0$ of the outer region), reflectivity R is expressed by the following formula:

$$R = \left|\frac{Y_e - Y_0}{Y_e + Y_0}\right|^2 \quad (13)$$

Therefore, when the following formulas are established, the refractive index becomes zero:

$$Y_e = x_e + iy_e = Y_0 = n_0 + i \cdot 0 \quad (14)$$

therefore, $x_e = n_0$, $y_e = 0$ \quad (15)

Therefore, the following relations are obtained by substituting Equation (15) into Equations (11) and (12):

$$x = \frac{n_0}{\left\{1 + \frac{n_0^2\tan^2\delta}{n^2}\right\}\cos^2\delta} \quad (16)$$

$$y = \frac{\left(\frac{n_0^2}{n} - n\right)\tan\delta}{1 + \frac{n_0^2\tan^2\delta}{n^2}} \quad (17)$$

From Equations (16) and (17), the following equations are obtained:

$$\frac{y}{x} = \frac{-n\left(1 - \frac{n_0^2}{n^2}\right)\tan\delta\cos^2\delta}{n_0} \quad (18)$$

$$\left(\frac{y}{x}\right)^2 = \frac{1}{4}\left(\frac{n}{n_0} - \frac{n_0}{n}\right)^2 \sin^2 2\delta \quad (19)$$

From Equation (18) and (19), the following equation is obtained by deleting $\delta$:

$$\left(x - \frac{n^2 + n_0^2}{2n_0^2}\right)^2 + y^2 = \left(\frac{n^2 + n_0^2}{2n_0^2}\right)^2 \quad (20)$$

Figure 2:
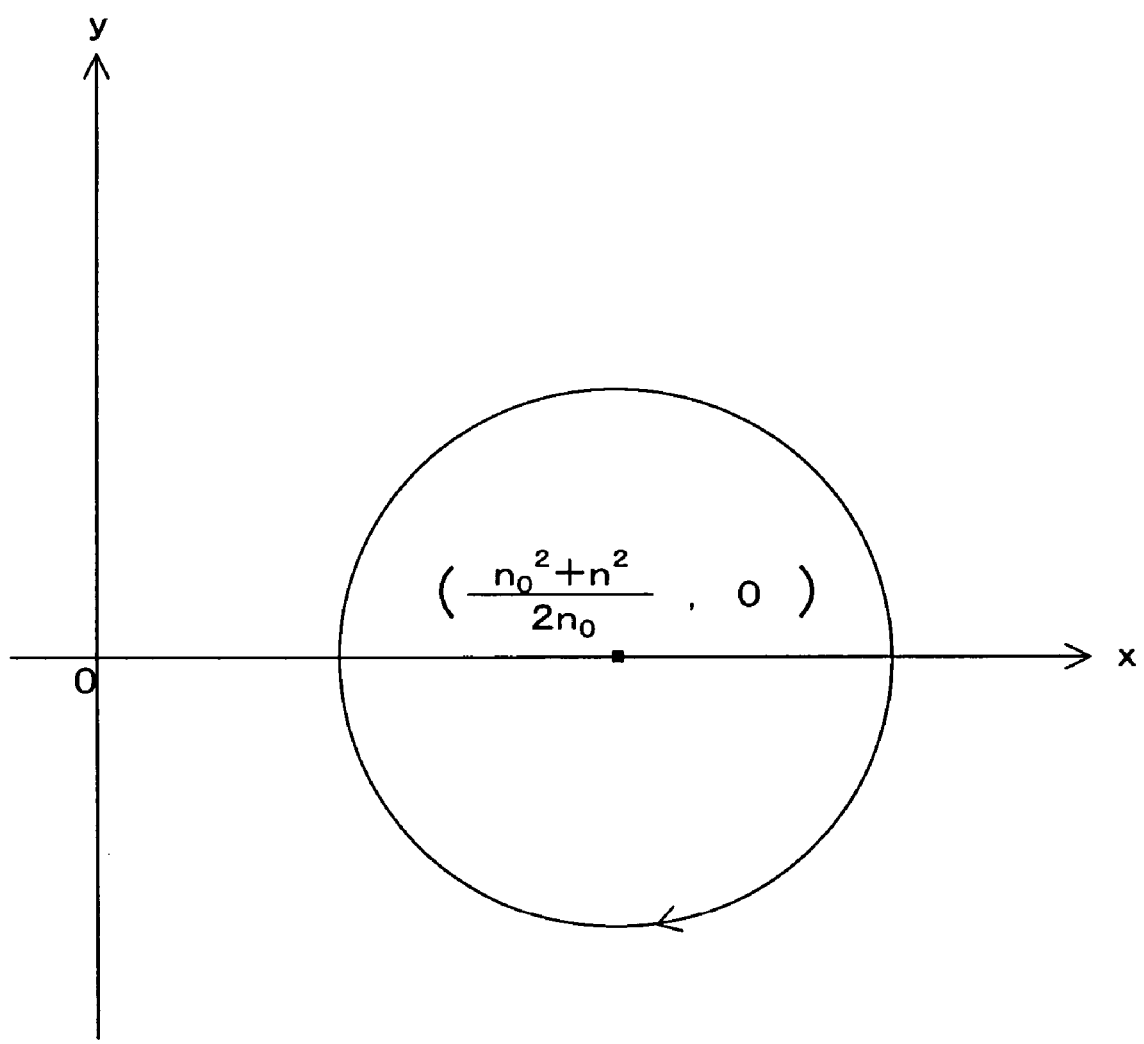
FIG. 2 shows a circle on a complex plane drawn by an optical admittance Y (Y=x+iy) at an interface between an outermost layer and a layer next to the outermost layer when the anti-reflection film according to the present invention has a reflectivity of zero.

Equation (20) draws a circle on the complex plane as shown in FIG. 2, in which the x axis represents a real portion and the y axis represents an imaginary portion. As shown in FIG. 2, Equation (20) draws the circle with a radius of $(n^2 - n_0^2)/2n_0$ around a central point at $((n_0^2 + n^2)/2n_0, 0)$. When the thickness of the outermost layer increases, the optical admittance Y moves on the circle clockwise. Accordingly, when the optical admittance Y at the interface between the outermost layer N and the layer N-1 next to the outermost layer is located on the circle represented by Equation (20) on the complex plane, it is possible to reduce the reflectivity to zero at the wavelength of $\lambda_0$ by adjusting the thickness d of the outermost layer N.

Conventionally, in designing an anti-reflection film, the optical admittance $Y_e$ at the outer point of the outermost layer is optimized. As a result, the calculation has been quite complicated due to many unknown parameters. According to the present invention, on the other hand, it is possible to readily design an anti-reflection film with excellent anti-reflection characteristics through adjusting the refractive index and thickness of the layer N-1 next to the outermost layer, so that the optical admittance Y is located on the circle represented by Equation (20).

Suppose that the transparent substrate has a reflective index of $n_s$, and a thin first layer with a reflective index of $n_1$ and a thickness of $d_1$ is formed on the substrate. The layer N-1 next to the outermost layer has a reflective index of $n_2$, and the layer N-1 is formed on the thin layer with a thickness of $d_2$. In this case, the optical admittance Y is given by the following equation:

$$Y = \frac{H}{E} = (x + iy) \quad (21)$$

$$\begin{bmatrix} E \\ H \end{bmatrix} = \begin{bmatrix} \cos\delta_2 & (i/n_2)\sin\delta_2 \\ in_2\sin\delta_2 & \cos\delta_2 \end{bmatrix} \begin{bmatrix} \cos\delta_1 & (i/n_1)\sin\delta_1 \\ in_1\sin\delta_1 & \cos\delta_1 \end{bmatrix} \begin{bmatrix} 1 \\ n_s \end{bmatrix} \quad (22)$$

$$\delta_1 = 2\pi n_1 d_1/\lambda_0 \quad (23)$$

$$\delta_2 = 2\pi n_2 d_2/\lambda_0 \quad (24)$$

Then, the outermost layer N is formed on the layer N-1. When the outermost layer N has a reflective index of $n_3$ and a thickness of $d_3$, the optical admittance $Y_e$ at an interface between the outermost layer and the outer region is represented by, $$Y_e = \frac{H_e}{E_e} \quad (25)$$

$$\begin{bmatrix} E_e \\ H_e \end{bmatrix} = \begin{bmatrix} \cos\delta_3 & (i/n_3)\sin\delta_3 \\ in_3\sin\delta_3 & \cos\delta_3 \end{bmatrix} \begin{bmatrix} \cos\delta_2 & (i/n_2)\sin\delta_2 \\ in_2\sin\delta_2 & \cos\delta_2 \end{bmatrix} \quad (26)$$

$$\begin{bmatrix} \cos\delta_1 & (i/n_1)\sin\delta_1 \\ in_1\sin\delta_1 & \cos\delta_1 \end{bmatrix} \begin{bmatrix} 1 \\ n_s \end{bmatrix}$$

$$\delta_3 = 2\pi n_3 d_3/\lambda_0 \quad (27)$$

The reflective index of the transparent substrate, the reflective index of $n_1$ and the thickness of $d_1$ of the first layer, the reflective index of $n_2$ and the thickness of $d_2$ of the layer N-1, and the reflective index $n_3$ of the outermost layer N are selected so that the optical admittance Y is located on the circle represented by Equation (28).

$$\left(x - \frac{n_3^2 + n_0^2}{2n_0^2}\right)^2 + y^2 = \left(\frac{n_3^2 + n_0^2}{2n_0^2}\right)^2 \quad (28)$$

where $n_0$ is a refractive index of a region outside the first layer.

Further, the reflective index of $n_3$ and the thickness of $d_3$ of the outermost layer N are selected so that the optical admittance $Y_e$ becomes closer to the reflective index $n_0$ of the outside region.

Further, it was found that it is possible to obtain an anti-reflection film with a low reflectivity of almost zero when the optical admittance Y is located within a range represented by the following formula, even when the optical admittance Y at the interface between the outermost layer N and the layer N-1 next to the outermost layer is not exactly located on the circle.

$$0.9 \times \{(n^2 - n_0^2)/2n_0\}^2 < \{x - (n^2 + n_0^2)/2n_0\}^2 + y^2 < 1.1 \times \{(n^2 - n_0^2)/2n_0\}^2 \quad (29)$$

Figure 3:
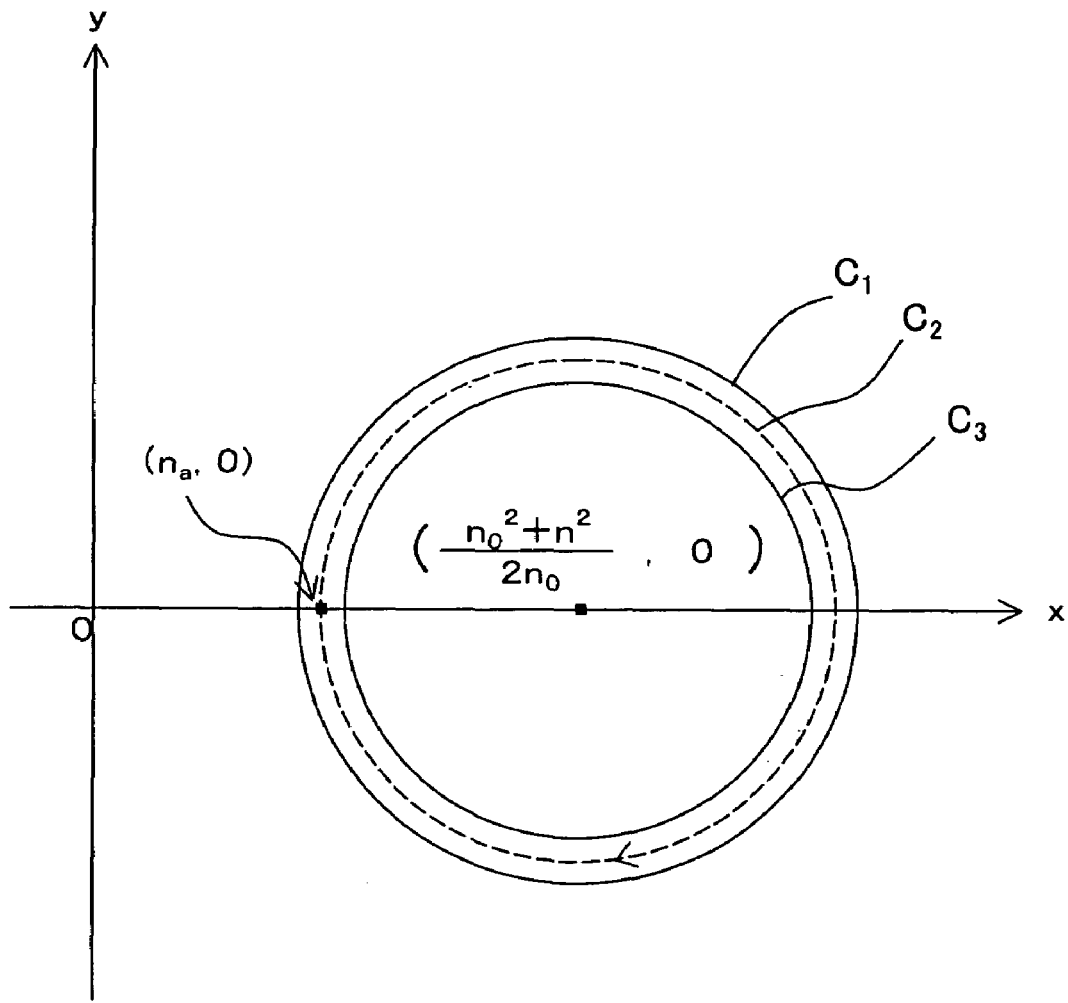
FIG. 3 shows a region around the circle on the complex plane drawn by the optical admittance Y (Y=x+iy) shown in FIG. 2.

FIG. 3 shows a region represented by Equation (29) on the complex plane. As shown in FIG. 3, it is possible to design an anti-reflective film with low reflectivity when the optical admittance Y at the interface between the outermost layer N and the layer N-1 next to the outermost layer is located within the circular region between circles C1 and C3. Consequently, the design of the film may be simplified as compared with the conventional method. The circles C1, C2 and C3 are represented as follows:

$$C1: \left(x - \frac{n^2 + n_0^2}{2n_0^2}\right)^2 + y^2 = 1.1 \cdot \left(\frac{n^2 + n_0^2}{2n_0^2}\right)^2 \quad (30)$$

$$C2: \left(x - \frac{n^2 + n_0^2}{2n_0^2}\right)^2 + y^2 = \left(\frac{n^2 + n_0^2}{2n_0^2}\right)^2 \quad (31)$$

$$C3: \left(x - \frac{n^2 + n_0^2}{2n_0^2}\right)^2 + y^2 = 0.9 \cdot \left(\frac{n^2 + n_0^2}{2n_0^2}\right)^2 \quad (32)$$

The circle C2 is represented by hidden line in FIG. 3. The circle C1 has a diameter 1.1 times larger than a diameter of the circle C2, and the circle C3 has a diameter 0.9 times smaller than the diameter of the circle C2.

In the present invention, it is also possible to form an additional thin layer between the transparent substrate and the first layer. In such a case, an additional term representing a contribution of the additional layer can be inserted in Equation (22) and (26) to obtain the optical admittance Y and $Y_e$. For example, when the additional layer has a reflective index of $n_j$ and a thickness of $d_j$, the following term is inserted.

$$\begin{bmatrix} \cos\delta_j & (i/n_i)\sin\delta_j \\ in_j\sin\delta_j & \cos\delta_j \end{bmatrix} \quad (33)$$

where $\delta_j = 2\pi n_j d_j/\lambda_0$ (34)

When more than two additional layers are formed, more than two additional terms are inserted in Equation (22) and (26).

EXAMPLE 1

A PET film with a thickness of 188 μm was used as the transparent substrate. The PET film had an attenuation coefficient of zero and a reflective index of 1.65. A hard coat material Z7501 commercially available from Nihon Synthetic Rubber Co. was coated on the transparent substrate to form a hard coat layer with a thickness of 5 μm. The hard coat layer had an attenuation coefficient of zero and a refractive index of about 1.5. Ag was deposited on the hard coat layer by sputtering to form a thin layer (next layer) with a thickness of 3.6 nm. The Ag layer had an attenuation coefficient of zero and a reflective index of 0.101. A mixture of a polyfunctional acrylic resin and silica was coated on the Ag layer by photogravure, and the coated layer was cured by UV irradiation after drying to form an outermost layer with a thickness of 50 nm. The outermost layer had an attenuation coefficient of zero and a refractive index of 1.51. The optical admittance Y at the interface between the Ag layer and the outermost layer was calculated as follows:

$Y = x + iy = 1.49 - 0.62i$

In Example 1, the outermost layer is exposed to air with the refractive index $n_0$ of 1.0. Suppose A is equal to the radius of the circle of Equation (20):

$A = \{(n^2 - n_0^2)/2n_0\}^2$

In Example 1, A is equal to $\{(1.51^2 - 1.0^2)/(2 \times 1.0)\}^2 = 0.410$.

Then, suppose B (middle term in Equation (29)) is expressed as follows:

$B = \{x - (n^2 + n_0^2)/2n_0\}^2 + y^2$

In Example 1, B is equal to $\{1.49-(1.51^2+1.0^2)/2+1.0\}^2+0.62^2=0.407$. Accordingly, B is located within the region between 0.369 and 0.451, i.e. values of A multiplied by 0.9 and 1.1, respectively. It was found that the reflectivity of the anti-reflection film at a wavelength of 550 nm was 0.0%.

EXAMPLE 2

An anti-reflection film was manufactured by the same method as in Example 1, except that Au was deposited by sputtering to form a layer (next layer) with a thickness of 5.9 nm, and the outermost layer had a thickness of 54 nm. The Au layer had an attenuation coefficient of zero and a reflective index of 0.35. The optical admittance Y at the interface between the outermost layer and the Au layer was calculated as follows:

$Y=x+iy=1.57-0.64i$

It was found that the anti-reflection film has the reflectivity of 0.0% at a wavelength of 550 nm. The values of A and B obtained by the same calculations in Example 1 are shown in Table 1.

Comparative Example 1

An anti-reflection film was manufactured by the same method as in Example 1, except that Ag was deposited by sputtering to form a layer (next layer) with a thickness of 16.5 nm, and the outermost layer had a thickness of 61 nm. The optical admittance Y at the interface between the outermost layer and the Ag layer was calculated as follows:

$Y=x+iy=0.98-2.37i$

It was found that the anti-reflection film has the reflectivity of 22.5% at a wavelength of 550 nm as shown in Table 1. The values of A and B obtained by the same calculations in Example 1 are also shown in Table 1.

TABLE 1

| | Next Layer Thickness | Outermost Layer Thickness | Outermost Layer Reflective Index | x − iy | A* | B** | Reflectivity (%) |
|---|---|---|---|---|---|---|---|
| Example 1 | 3.6 nm | 50 nm | 1.51 | 1.49 − 0.62i | 0.410 | 0.407 | 0.0 |
| Example 2 | 5.9 nm | 54 nm | 1.51 | 1.57 − 0.64i | 0.410 | 0.415 | 0.0 |
| Comparative Example 1 | 16.5 nm | 61 nm | 1.51 | 0.98 − 2.37i | 0.410 | 6.053 | 22.5 |

*$A = \{(n^2 - n_0^2)/2n_0\}^2$
**$B = \{x - (n^2 + n_0^2)/2n_0\}^2 + y^2$

As shown in the examples and comparative example, the present invention provides the method of producing the anti-reflection film with a low reflectivity. The present invention is applicable to many other arrangements.

While the invention has been explained with reference to the specific embodiments of the invention, the explanation is illustrative and the invention is limited only by the appended claims.

What is claimed is:

1. A method of producing an anti-reflection film, comprising:

selecting a first material having a-reflective index of $n_1$, coating the first material on a transparent substrate having a reflective index of $n_s$ to form a first layer having a thickness of $d_1$, selecting a second material having a reflective index of $n_2$, coating the second material on the first layer to form a second layer having a thickness of $d_2$ so that an optical admittance Y at a surface of the second layer opposite to the first layer is represented by, $$Y = \frac{H}{E} = (x+iy)$$

where i is the imaginary number unit, $$\begin{bmatrix} E \\ H \end{bmatrix} = \begin{bmatrix} \cos\delta_2 & (i/n_2)\sin\delta_2 \\ in_2\sin\delta_2 & \cos\delta_2 \end{bmatrix} \begin{bmatrix} \cos\delta_1 & (i/n_1)\sin\delta_1 \\ in_1\sin\delta_1 & \cos\delta_1 \end{bmatrix} \begin{bmatrix} 1 \\ n_s \end{bmatrix}$$

$\delta_1 = 2\pi n_1 d_1/\lambda_0$ $\delta_2 = 2\pi n_2 d_2/\lambda_0$ where $\lambda_0$ is a wavelength of incident light in vacuum, selecting a third material having a reflective index of $n_3$, and coating the third material on the second layer to form a third layer having a thickness of $d_3$, wherein said reflective index of the transparent substrate, the reflective index and the thickness of the first layer, the reflective index and the thickness of the second layer, and the reflective index of the third layer are selected so that x and y satisfy the following formula, $0.9x\{(n_3^2-n_0^2)/2n_0\}^2 < \{x-(n_3^2+n_0^2)/2n_0\}^2+y^2 < 1.1x\{(n_3^2-n_0^2)/2n_0\}^2$ where $n_0$ is a refractive index of an outer region at an outside of the anti-reflection film.

2. A method of producing an anti-reflection film according to claim 1, wherein said third layer is formed so that an optical admittance $Y_e$ at a surface of the third layer opposite to the second layer is represented by, $$Y_e = \frac{H_e}{E_e}$$

$$\begin{bmatrix} E_e \\ H_e \end{bmatrix} = \begin{bmatrix} \cos\delta_3 & (i/n_3)\sin\delta_3 \\ in_3\sin\delta_3 & \cos\delta_3 \end{bmatrix} \begin{bmatrix} \cos\delta_2 & (i/n_2)\sin\delta_2 \\ in_2\sin\delta_2 & \cos\delta_2 \end{bmatrix}$$
$$\begin{bmatrix} \cos\delta_1 & (i/n_1)\sin\delta_1 \\ in_1\sin\delta_1 & \cos\delta_1 \end{bmatrix} \begin{bmatrix} 1 \\ n_s \end{bmatrix}$$

$\delta_3 = 2b\pi n_3 d_3/\lambda_0$ said thickness of the third layer being selected so that $E_e$ is substantially equal to 1 and $H_e$ is substantially equal to $n_0$.

3. A method of producing an anti-reflection film according to claim 1, further comprising forming at least one additional j-th layer having a reflective index of $n_j$ and a thickness of $d_j$ on the transparent substrate before forming the first layer where j is a natural number at least 4 so that an optical admittance Y' at the surface of the second layer opposite to the first layer is represented by, $$Y' = \frac{H'}{E'} = (x' + iy')$$

$$\begin{bmatrix} E' \\ H' \end{bmatrix} = \begin{bmatrix} \cos\delta_2 & (i/n_2)\sin\delta_2 \\ in_2\sin\delta_2 & \cos\delta_2 \end{bmatrix} \begin{bmatrix} \cos\delta_1 & (i/n_1)\sin\delta_1 \\ in_1\sin\delta_1 & \cos\delta_1 \end{bmatrix}$$
$$\begin{bmatrix} \cos\delta_j & (i/n_j)\sin\delta_j \\ in_j\sin\delta_j & \cos\delta_j \end{bmatrix} \ldots \begin{bmatrix} 1 \\ n_s \end{bmatrix}$$

$$\delta_j = 2\pi n_j d_j / \lambda_0$$

wherein said reflective index of the transparent substrate, the reflective index and the thickness of the first layer, the reflective index and the thickness of the second layer, the reflective index of the third layer, and the reflective index and the thickness of the at least one additional j-th layer are selected so that x' and y' satisfy the following formula, $$0.9x\{(n_3^2-n_0^2)/2n_0\}^2 < \{x'-(n_3^2+n_0^2)/2n_0\}^2 + y'^2 < 1.1x\{(n_3^2-n_0^2)/2n_0\}^2$$

4. A method of producing an anti-reflection film according to claim 3, wherein said third layer is formed so that an optical admittance $Y'_e$ at the surface of the third layer opposite to the second layer is represented by, $$Y'_e = \frac{H'_e}{E'_e}$$

$$\begin{bmatrix} E'_e \\ H'_e \end{bmatrix} = \begin{bmatrix} \cos\delta_3 & (i/n_3)\sin\delta_3 \\ in_3\sin\delta_3 & \cos\delta_3 \end{bmatrix} \begin{bmatrix} \cos\delta_2 & (i/n_2)\sin\delta_2 \\ in_2\sin\delta_2 & \cos\delta_2 \end{bmatrix}$$

$$\begin{bmatrix} \cos\delta_1 & (i/n_1)\sin\delta_1 \\ in_1\sin\delta_1 & \cos\delta_1 \end{bmatrix} \begin{bmatrix} \cos\delta_j & (i/n_j)\sin\delta_j \\ in_j\sin\delta_j & \cos\delta_j \end{bmatrix} \ldots \begin{bmatrix} 1 \\ n_s \end{bmatrix},$$

said thickness of the third layer being selected so that $E'_e$ is substantially equal to 1 and $H'_e$ is substantially equal to $n_0$.

5. A method of producing an anti-reflection film according to claim 1, wherein said third layer has an attenuation coefficient of substantially zero.

6. A method of producing an anti-reflection film according to claim 1, wherein said second layer has an attenuation coefficient more than 0.001 at a wavelength of 550 nm.

7. A method of producing an anti-reflection film according to claim 1, wherein said second layer has an attenuation coefficient between 0.01 and 10 at a wavelength of 550 nm.

8. A method of producing an anti-reflection film according to claim 1, wherein said transparent substrate is formed of a synthetic resin.

9. A method of producing an anti-reflection film according to claim 1, wherein said second layer is formed of a composite material containing fine particles of at least one selected from the group consisting of metal, metal oxide and metal nitride.

10. A method of producing an anti-reflection film according to claim 1, wherein said second layer is a thin film formed of at least one selected from the group consisting of metal, metal oxide and metal nitride.

11. A method of producing an anti-reflection film according to claim 1, wherein said second layer has a thickness smaller than 30 nm.

12. A method of producing an anti-reflection film according to claim 1, wherein said transparent substrate is formed of polyester.

13. A method of producing an anti-reflection film according to claim 1, wherein said transparent substrate has a thickness between 30 to 300 μm.

* * * * *